United States Patent [19]

Schmidhauser et al.

[11] Patent Number: 5,830,974
[45] Date of Patent: Nov. 3, 1998

[54] METHOD FOR PREPARING AROMATIC POLYETHER POLYMERS

[75] Inventors: John Christopher Schmidhauser, Niskayuna; Daniel Joseph Brunelle, Burnt Hills, both of N.Y.

[73] Assignee: General Electric Company, Schenectady, N.Y.

[21] Appl. No.: 799,886

[22] Filed: Feb. 13, 1997

[51] Int. Cl.[6] .............................. C08G 8/02; C08G 14/00; C08G 65/00; C08G 75/00

[52] U.S. Cl. ....................... 528/125; 528/126; 528/170; 528/171; 528/173; 528/175; 528/183; 528/219; 528/128; 546/256; 546/304

[58] Field of Search ............................... 528/125, 21, 126, 528/128, 170, 171, 173, 175, 183, 219; 546/256, 304

[56] References Cited

U.S. PATENT DOCUMENTS 5,229,482   7/1993   Brunelle .

*Primary Examiner*—Duc Truong
*Attorney, Agent, or Firm*—Noreen C. Johnson; Douglas E. Stoner

[57] ABSTRACT

Aromatic polyether polymers, illustrated by polyethersulfones, polyetherketones and polyetherimides, are prepared by a phase transfer catalyzed reaction between a salt of at least one dihydroxyaromatic compound and at least one substituted aromatic compound such as bis(4-chlorophenyl) sulfone, bis(4-chlorophenyl) ketone or 1,3-bis[N-(4-chlorophthalimido)]benzene, in a monoalkoxybenzene such as anisole as diluent and in the presence of a phase transfer catalyst, preferably a hexaalkylguanidinium salt.

20 Claims, No Drawings

METHOD FOR PREPARING AROMATIC POLYETHER POLYMERS

BACKGROUND OF THE INVENTION

This invention relates to the preparation of aromatic polyether polymers, and more particularly to their preparation using a specific solvent.

Various types of aromatic polyethers, particularly polyetherimides, polyethersulfones and polyetherketones, have become important as engineering resins by reason of their excellent properties. These polymers are typically prepared by the reaction of salts of dihydroxyaromatic compounds, such as bisphenol A disodium salt, with dihaloaromatic molecules. Examples of suitable dihaloaromatic molecules are bis(4-fluorophenyl) sulfone, bis(4-chlorophenyl) sulfone, the analogous ketones and bisimides as illustrated by 1,3-bis[N-(4-chlorophthalimido)]benzene.

According to U.S. Pat. No. 5,229,482, the preparation of aromatic polyethers by this method may be conducted in solution in relatively non-polar solvents, using a phase transfer catalyst which is substantially stable under the temperature conditions employed. Suitable solvents disclosed therein are o-dichlorobenzene, dichlorotoluene, 1,2,4-trichlorobenzene and diphenyl sulfone.

These solvents are relatively expensive and also present environmental problems. It would be desirable, therefore, to employ a less expensive and more environmentally friendly material as solvent. The choice of a suitable solvent, however, is by no means trivial.

Among the factors crucial to the selection of a solvent or diluent for the polymerization reaction are the solubilities and reactivities of reactants and intermediates therein, the effectiveness of the solvent in stabilizing intermediate species and its effectiveness in permitting molecular weight build to the desired level. These factors for any selected solvent are not easy to predict.

For example, while it might be expected that one or more isomeric dimethoxybenzenes would be suitable, it is not effective in the preparation of polyetherimides of high molecular weight, typically represented by a weight average molecular weight of at least about 30,000 as determined by gel permeation chromatography relative to polystyrene. Since many of the reactants employed in the preparation of such polymers are themselves not soluble in the dimethoxybenzenes, it might be considered that this fact is the source of the problem. However, the situation would then be expected to be improved by the employment of a phase transfer catalyst, and this is not observed.

It is of interest, therefore, to develop a method for the preparation of aromatic polyether polymers using a diluent which has the aforementioned improved properties and which also has the desired reactivity characteristics, thus permitting preparation of high molecular weight products.

SUMMARY OF THE INVENTION

The present invention is based on the discovery that monoalkoxybenzenes such as anisole are efficient diluents for the preparation of polyether polymers.

Accordingly, the present invention in one of its aspects is a method for preparing an aromatic polyether polymer which comprises contacting, in at least one monoalkoxybenzene as diluent, substantially equimolar amounts of at least one alkali metal salt of a dihydroxy-substituted aromatic hydrocarbon and at least one substituted aromatic compound of the formula $$Z(A^1\text{---}X^1)_2 \qquad (I)$$

wherein Z is an activating radical, $A^1$ is an aromatic radical and $X^1$ is fluoro, chloro, bromo or nitro, in the presence of a catalytically active amount of a phase transfer catalyst.

Another aspect of the invention is compositions capable of conversion to aromatic polyether polymers upon heating at the above-defined temperatures. Said compositions comprise the above-identified diluent, alkali metal salt, substituted aromatic compound and phase transfer catalyst.

DETAILED DESCRIPTION; PREFERRED EMBODIMENTS

The alkali metal salts of dihydroxy-substituted aromatic hydrocarbons which are employed in the present invention are typically sodium and potassium salts. Sodium salts are frequently preferred by reason of their availability and relatively low cost. Said salt may be employed in anhydrous form. However, in certain instances the employment of a hydrate, such as the hexahydrate of the bisphenol A sodium salt, may be advantageous provided water of hydration is removed before the substituted aromatic compound is introduced.

Suitable dihydroxy-substituted aromatic hydrocarbons include those having the formula $$HO\text{---}A^2\text{---}OH \qquad (II)$$

wherein $A^2$ is a divalent aromatic hydrocarbon radical. Suitable $A^2$ radicals include m-phenylene, p-phenylene, 4,4'-biphenylene, 4,4'-bi(3,5-dimethyl)phenylene, 2,2-bis(4-phenylene)propane and similar radicals such as those which correspond to the dihydroxy-substituted aromatic hydrocarbons disclosed by name or formula (generic or specific) in U.S. Pat. No. 4,217,438.

The $A^2$ radical preferably has the formula $$\text{---}A^3\text{---}Y\text{---}A^4\text{---}, \qquad (III)$$

wherein each of $A^3$ and $A^4$ is a monocyclic divalent aromatic hydrocarbon radical and Y is a bridging hydrocarbon radical in which one or two atoms separate $A^3$ from $A^4$. The free valence bonds in formula III are usually in the meta or para positions of $A^3$ and $A^4$ in relation to Y. Compounds in which $A^2$ has formula III are bisphenols, and for the sake of brevity the term "bisphenol" is sometimes used herein to designate the dihydroxy-substituted aromatic hydrocarbons; it should be understood, however, that non-bisphenol compounds of this type may also be employed as appropriate.

In formula III, the $A^3$ and $A^4$ values may be unsubstituted phenylene or hydrocarbon-substituted derivatives thereof, illustrative substituents (one or more) being alkyl and alkenyl. Unsubstituted phenylene radicals are preferred. Both $A^3$ and $A^4$ are preferably p-phenylene, although both may be o- or m-phenylene or one o- or m-phenylene and the other p-phenylene.

The bridging radical, Y, is one in which one or two atoms, preferably one, separate $A^3$ from $A^4$. Illustrative radicals of this type are methylene, cyclohexylmethylene, 2-[2.2.1]-bicycloheptylmethylene, ethylene, isopropylidene, neopentylidene, cyclohexylidene, cyclopentadecylidene, cyclododecylidene and adamantylidene; gem-alkylene (alkylidene) radicals are preferred. Also included, however, are unsaturated radicals. For reasons of availability and particular suitability for the purposes of this invention, the preferred radical of formula III is the 2,2-bis(4-phenylene) propane radical, which is derived from bisphenol A and in which Y is isopropylidene and $A^3$ and $A^4$ are each p-phenylene.

Spiro(bis)indane bisphenols may also be employed. They include 6,6'-dihydroxy-3,3,3',3'-tetramethylspiro(bis)indane and its substituted analogs.

The substituted aromatic compounds of formula I which are employed in the present invention contain an aromatic radical $A^1$ and an activating radical Z. The $A^1$ radical is normally a di- or polyvalent $C_{6-10}$ radical, preferably monocyclic and preferably free from electron-withdrawing substituents other than Z. Unsubstituted $C_6$ aromatic radicals are especially preferred.

The Z radical is usually an electron-withdrawing group, which may be di- or polyvalent to correspond with the valence of $A^1$. Examples of divalent radicals are carbonyl, carbonylbis(arylene), sulfone, bis(arylene) sulfone, benzo-1,2-diazine and azoxy. Thus, the moiety —$A^1$—Z—$A^1$— may be a bis(arylene) sulfone, bis(arylene) ketone, tris(arylene)bis(sulfone), tris(arylene)bis(ketone), bis(arylene) benzo-1,2-diazine or bis(arylene)azoxy radical and especially one in which $A^1$ is p-phenylene.

Also included are compounds in which —$A^1$—Z—$A^1$— is a bisimide radical, illustrated by those of the formula

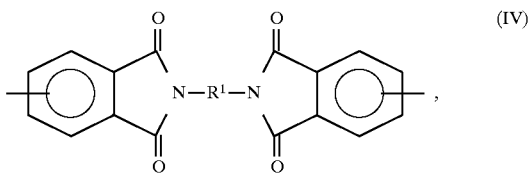

wherein $R^1$ is a $C_{6-20}$ divalent aromatic hydrocarbon or halogenated hydrocarbon radical, a $C_{2-20}$ alkylene or cycloalkylene radical, a $C_{2-8}$ bis(alkylene-terminated) polydiorganosiloxane radical or a divalent radical of the formula

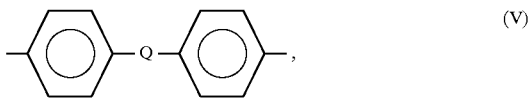

in which Q is

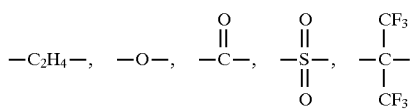

or a covalent bond. Most often, $R^1$ is at least one of m-phenylene, p-phenylene, 4,4'-oxybis(phenylene) and

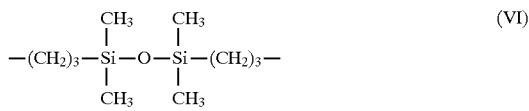

Polyvalent Z radicals include those which, with $A^1$, form part of a fused ring system such as benzimidazole, benzoxazole, quinoxaline or benzofuran.

Also present in the substituted aromatic compound of formula I are two displaceable $X^1$ radicals which may be fluoro, chloro, bromo or nitro. In most instances, fluoro and chloro atoms are preferred by reason of the relative availability and effectiveness of the compounds containing them.

Among the particularly preferred substituted aromatic compounds of formula I are bis(4-fluorophenyl) sulfone and the corresponding chloro compound, bis(4-fluorophenyl) ketone and the corresponding chloro compound, and 1,3- and 1,4-bis[N-(4-fluorophthalimido)]benzene and 4,4'-bis[N-(4-fluorophthalimido)]phenyl ether and the corresponding chloro, bromo and nitro compounds.

Monoalkoxybenzenes, especially anisole (i.e., methoxybenzene), are the diluents employed according to the present invention. They have the advantages of being relatively harmless to the environment and having properties such that the intermediates and products have high enough solubility to permit formation of a high molecular weight product.

This is surprising for at least two reasons. First, as observed hereinabove, the isomeric dimethoxybenzenes, which are closely related in molecular structure, does not permit the preparation of a high molecular weight polyetherimide. Second, anisole and the dimethoxybenzenes are similar in their failure to dissolve, at least entirely, the monomers employed in the reaction; therefore, they might be expected to be uniformly inadequate from the standpoint of high molecular weight polymer build.

Also present in the reaction mixture is a phase transfer catalyst, preferably one which is substantially stable at the temperatures employed; i.e., in the range of about 125°–250° C. Various types of phase transfer catalysts may be employed for this purpose. They include quaternary phosphonium salts of the type disclosed in U.S. Pat. No. 4,273,712, N-alkyl-4-dialkylaminopyridinium salts of the type disclosed in U.S. Pat. No. 4,460,778 and 4,595,760, and guanidinium salts of the type disclosed in the aforementioned U.S. Pat. No. 5,229,482. Said patents and application are incorporated by reference herein. The preferred phase transfer catalysts, by reason of their exceptional stability at high temperatures and their effectiveness to produce high molecular weight aromatic polyether polymers in high yield are the hexaalkylguanidinium and α,ω-bis(pentaalkylguanidinium)alkane salts.

The bisphenol salt and substituted aromatic compound are typically brought into contact in substantially equimolar amounts. For maximum molecular weight, the amounts should be as close as possible to exactly equimolar, but molecular weight control may be achieved by employing one reagent or the other in slight excess. It is also within the scope of the invention to employ monofunctional reagents such as monohydroxyaromatic compounds or monohalo- or nitroaromatic compounds as chain termination agents.

Reaction temperatures are in the range of about 125°–250° C., preferably about 130°–225° C. The proportion of phase transfer catalyst is generally about 0.5–10 and preferably about 1–5 mole percent based on bisphenol salt. For best results, an intimate blending method such as vigorous stirring is employed since the rate of the polymerization reaction is highly dependent on efficiency of blending.

Following completion of the reaction, the aromatic polyether polymer may be isolated by conventional methods. This typically includes the steps of washing and precipitation by combination of the polymer solution with a non-solvent for the polymer.

The method of this invention is illustrated by the following examples. The "percent solids" parameter in the examples is the amount of product polymer as a percentage of polymer solution, assuming complete reaction of monomeric reagents.

EXAMPLES 1–4

Three-necked round-bottomed flasks, each fitted with a paddle stirrer, nitrogen purge means and distillation head, were charged with various solutions of bisphenol A disodium salt hexahydrate in anisole. The solutions were heated at 185° C. under nitrogen to distill out water of hydration with some anisole, after which solutions of 1,3-bis[N-(4- chlorophthalimido)]benzene in anisole were added and a small additional portion of anisole removed by distillation. Hexaethylguanidinium bromide [HEGBr] or chloride (HEGCl) was added in the amount of 4 mole percent based on bisphenol A salt, and the resulting mixtures were stirred under reflux in a nitrogen atmosphere. Samples were periodically removed and analyzed by gel permeation chromatography for polymer molecular weight. The results are given in Table I; weight average molecular weights are relative to polystyrene.

TABLE I

| Example | % solids | Catalyst | Weight average molecular weight | | |
|---------|----------|----------|--------|--------|---------|
|         |          |          | 2 hrs. | 5 hrs. | 18 hrs. |
| 1 | 15 | HEGCl | 20,600 | 24,100 | 50,200 |
| 2 | 25 | HEGCl | 21,000 | 35,100 | 53,800 |
| 3 | 30 | HEGCl | 22,400 | 37,300 | 49,500 |
| 4 | 25 | HEGBr | 20,100 | 32,300 | 51,400 |

EXAMPLE 5

The procedure of Example 4 was repeated, except that the solids level was 20% and the reaction was run in a 38-l stainless steel reactor with a dual pitched turbine blade stirrer and on a scale appropriate to the reactor. The molecular weight after 2 hours reaction time was 61,200. This example demonstrates the advantage of employing efficient stirring.

EXAMPLE 6

A solution of 46.553 g (250 mmol) of 4,4'-dihydroxybiphenyl in 500 ml of anhydrous degassed methanol was combined with 40.482 g of a 49.4% aqueous sodium hydroxide solution (500 mmol of NaOH) and enough degassed water (about 100 ml) was added to effect solution. The solution was transferred in the absence of air to an addition funnel and slowly added to a 3-liter flask containing vigorously stirred, refluxing xylene at such a rate that water and methanol immediately distilled out of the flask, producing the disodium salt of a 4,4'-dihydroxybiphenyl in finely particulate form. The slurry was heated under reflux to collect water in a Dean-Stark trap, and then transferred to a dry box in which the salt was removed by filtration, placed in a 500-ml round-bottomed flask and vacuum dried at 150° C. for 16 hours.

By a similar procedure, bisphenol A disodium salt was prepared from 114.14 g (500 mol) of bisphenol A.

A dry 50-ml three-necked flask was placed in the dry box and charged with 2.337 g (10.15 mmol) of the 4,4'-dihydroxybiphenyl disodium salt and 2.87 g (10 mmol) of bis-(4-chlorophenyl) sulfone. The flask was capped, fitted with a condenser, nitrogen purge means and mechanical stirrer and transferred to an oil bath maintained at 160° C. Anisole, 25 ml, was added and the mixture was heated to reflux, allowing about 5 ml of anisole to distill to dry the reagents. Hexa-N-propylguanidinium chloride, 175 mg (0.5 mmol) in solution in about 1 ml of anisole was added over 1 minute whereupon a vigorous exothermic reaction occurred. Heating was continued and the reaction was sampled periodically by removing about 0.2 ml, quenching with acetic acid and diluting with methylene chloride for analysis by gel permeation chromatography. The results are given in Table II.

TABLE II

| Time, hr. | Mw |
|-----------|--------|
| 0.25 | 2,500 |
| 0.5  | 2,500 |
| 1    | 2,700 |
| 2    | 7,700 |
| 3    | 18,000 |
| 4    | 37,200 |
| 5    | 46,800 |
| 6    | 47,900 |

It is apparent that anisole is an excellent solvent for polyethersulfone preparation.

What is claimed is:

1. A method for preparing an aromatic polyether polymer which comprises contacting, in at least one monoalkoxybenzene as diluent, substantially equimolar amounts of at least one alkali metal salt of a dihydroxy-substituted aromatic hydrocarbon and at least one substituted aromatic compound of the formula $$Z(A^1-X^1)_2, \tag{I}$$

wherein Z is an activating radical, $A^1$ is an aromatic radical and $X^1$ is fluoro, chloro, bromo or nitro, in the presence of a catalytically active amount of a phase transfer catalyst.

2. A method according to claim 1 wherein the monoalkoxybenzene is anisole.

3. A method according to claim 2 wherein the phase transfer catalyst is a quaternary phosphonium salt, an alkylaminopyridinium salt or a guanidinium salt.

4. A method according to claim 3 wherein the phase transfer catalyst is a hexaalkylguanidinium or α,ω-bis (pentaalkylguanidinium)alkane salt.

5. A method according to claim 2 wherein the dihydroxy-substituted aromatic hydrocarbon has the formula HO—$A^3$—Y—$A^4$—OH, wherein each of $A^3$ and $A^4$ is a monocyclic divalent aromatic hydrocarbon radical and Y is a bridging hydrocarbon radical in which one or two atoms separate $A^3$ from $A^4$.

6. A method according to claim 2 wherein $A^1$ is p-phenylene.

7. A method according to claim 6 wherein Z is a sulfone radical.

8. A method according to claim 6 wherein Z is a carbonyl radical.

9. A method according to claim 2 wherein —$A^1$—Z—$A^1$— is a bisimide radical of the formula

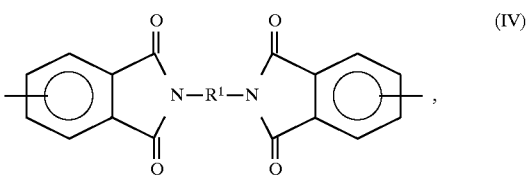

wherein $R^1$ is a $C_{6-20}$ divalent aromatic hydrocarbon or halogenated hydrocarbon radical, a $C_{2-20}$ alkylene or cycloalkylene radical, a $C_{2-8}$ bis(alkylene-terminated) polydiorganosiloxane radical or a divalent radical of the formula

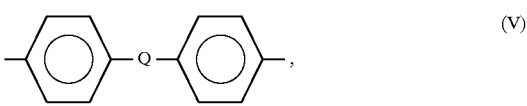

in which Q is

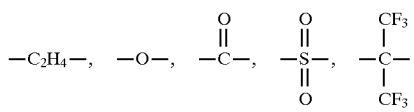

or a covalent bond.

10. A method according to claim 9 wherein $X^1$ is fluoro or chloro.

11. A method according to claim 2 wherein the dihydroxy-substituted aromatic hydrocarbon is bisphenol A.

12. A method according to claim 2 wherein the reaction temperature is in the range of about 130°–225° C.

13. A method according to claim 2 wherein the phase transfer catalyst is a guanidinium salt.

14. A method according to claim 13 wherein the proportion of phase transfer catalyst employed is about 1–5 mole percent based on the dihydroxy-substituted aromatic hydrocarbon salt.

15. A composition capable of conversion to an aromatic polyether polymer upon heating at a temperature in the range of about 125°–250° C., said composition comprising at least one monoalkoxybenzene as diluent, substantially equimolar amounts of at least one alkali metal salt of a dihydroxy-substituted aromatic hydrocarbon and at least one substituted aromatic compound of the formula $$Z(A^1\text{—}X^1)_2, \qquad (I)$$

wherein Z is an activating radical, $A^1$ is an aromatic radical and $X^1$ is fluoro, chloro, bromo or nitro, and a catalytically active amount of a phase transfer catalyst.

16. A composition according to claim 15 wherein the monoalkoxybenzene is anisole.

17. A composition according to claim 16 wherein Z is a sulfone radical.

18. A composition according to claim 16 wherein Z is a carbonyl radical.

19. A composition according to claim 16 wherein —$A^1$—Z—$A^1$— is a bisimide radical of the formula

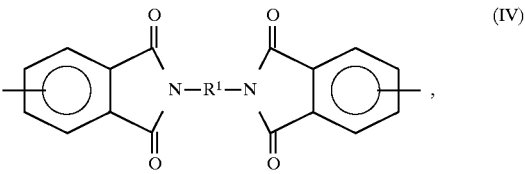

wherein $R^1$ is a $C_{6-20}$ divalent aromatic hydrocarbon or halogenated hydrocarbon radical, a $C_{2-20}$ alkylene or cycloalkylene radical, a $C_{2-8}$ bis(alkylene-terminated) polydiorganosiloxane radical or a divalent radical of the formula

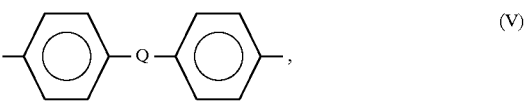

in which Q is

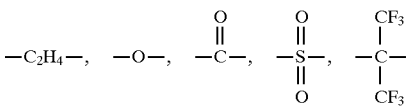

or a covalent bond.

20. A composition according to claim 16 wherein the dihydroxy-substituted aromatic hydrocarbon is bisphenol A.

* * * * *